(12) United States Patent
Park et al.

(10) Patent No.: US 9,167,549 B2
(45) Date of Patent: Oct. 20, 2015

(54) METHOD AND APPARATUS FOR LOCATION UPDATE IN A WIRELESS COMMUNICATION SYSTEM

(75) Inventors: Gi Won Park, Anyang-si (KR); Young Soo Yuk, Anyang-si (KR); Jeong Ki Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 162 days.

(21) Appl. No.: 13/985,704

(22) PCT Filed: Feb. 20, 2012

(86) PCT No.: PCT/KR2012/001247
§ 371 (c)(1),
(2), (4) Date: Aug. 15, 2013

(87) PCT Pub. No.: WO2012/115406
PCT Pub. Date: Aug. 30, 2010

(65) Prior Publication Data
US 2013/0324157 A1    Dec. 5, 2013

Related U.S. Application Data

(60) Provisional application No. 61/445,021, filed on Feb. 21, 2011, provisional application No. 61/452,120, filed on Mar. 13, 2011.

(51) Int. Cl.
*H04W 60/00* (2009.01)
*H04W 64/00* (2009.01)
(Continued)

(52) U.S. Cl.
CPC ............. *H04W 64/00* (2013.01); *H04W 60/00* (2013.01); *H04W 4/005* (2013.01); *H04W 8/24* (2013.01);
(Continued)

(58) Field of Classification Search
CPC . H04W 60/00; H04W 36/0016; H04W 4/005; H04W 36/08; H04W 36/12; H04W 48/20; H04W 28/0215; H04W 36/0077; H04W 36/0083; H04W 36/04; H04W 36/14; H04W 74/006; H04W 76/02; H04W 84/005; H04W 8/04; H04W 8/06; H04W 8/26; H04W 8/0226; H04W 36/00; H04W 36/0055; H04W 36/10; H04W 48/18; H04W 4/025; H04W 60/06; H04W 72/02; H04W 72/048
USPC ...................... 370/331, 328; 455/432.1–444, 455/456.1–457
See application file for complete search history.

(56) References Cited

U.S. PATENT DOCUMENTS

2009/0154386 A1* 6/2009 So et al. ................. 370/311
2009/0217364 A1 8/2009 Salmela et al.
(Continued)

FOREIGN PATENT DOCUMENTS

EP    2 247 145 A1    11/2010

OTHER PUBLICATIONS

Draft Amendment to IEEE Standard for Local and metropolitan area networks Part 16: Air Interface for Broadband Wireless Access Systems Advanced Air Interface by IEEE, dated Oct. 6, 2010.*
WiMAX Forum® Network Architecture Architecture Tenets, Reference Model and Reference Points Base Specification by WiMAX Forum, dated Nov. 30, 2010.*
(Continued)

*Primary Examiner* — Daniel Lai
(74) *Attorney, Agent, or Firm* — Dentons US LLP (57) ABSTRACT

Provided are a method and apparatus for location update in a wireless communication system. A machine-to-machine (M2M) device transmits a mobility access classifier indicating the mobility access classification of the M2M device to a first base station, and receives information on a reattachment zone indicating a list of base stations accessible by the M2M device from the first station. The M2M device transits to an idle mode, and provides a location update to a second base station based on whether or not the second M2M device has exited the reattachment zone.

14 Claims, 8 Drawing Sheets

(51) Int. Cl.
  *H04W 4/00* (2009.01)
  *H04W 8/24* (2009.01)
  *H04W 28/04* (2009.01)
  *H04W 28/06* (2009.01)
  *H04W 48/16* (2009.01)
  *H04W 92/18* (2009.01)
  *H04W 74/00* (2009.01)

(52) U.S. Cl.
  CPC .............. *H04W 28/04* (2013.01); *H04W 28/06* (2013.01); *H04W 48/16* (2013.01); *H04W 74/004* (2013.01); *H04W 74/006* (2013.01); *H04W 92/18* (2013.01)

(56) References Cited

U.S. PATENT DOCUMENTS

| | | | |
|---|---|---|---|
| 2010/0165921 A1* | 7/2010 | Maheshwari et al. | 370/328 |
| 2011/0076987 A1* | 3/2011 | Lee et al. | 455/411 |
| 2011/0077008 A1* | 3/2011 | Lu et al. | 455/436 |
| 2011/0105115 A1* | 5/2011 | Li et al. | 455/432.1 |
| 2011/0149926 A1* | 6/2011 | Li et al. | 370/338 |

OTHER PUBLICATIONS

Li, et al, A Novel Quorum Based Location Management for Wireless Sensor Network with Mobile Sinks, 2009 Third International Conference on Sensor Technologies and Applications, Jun. 23, 2009, pp. 320-326.

* cited by examiner

METHOD AND APPARATUS FOR LOCATION UPDATE IN A WIRELESS COMMUNICATION SYSTEM

This Application is a 35 U.S.C. §371 National Stage Entry of International Application No. PCT/KR2012/001247, filed Feb. 20, 2012, and claims the benefit of U.S. Provisional Application No. 61/445,021, filed Feb. 21, 2011 and U.S. Provisional Application No. 61/452,120, filed Mar. 13, 2011, all of which are incorporated by reference in their entirety herein.

BACKGROUND OF THE INVENTION

1. Field of the Invention

The present invention relates to wireless communications, and more particularly, to a method and apparatus for a location update in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the IEEE 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

A user equipment (UE) can perform a location update when a specific condition is satisfied. When performing the location update process, a base station (BS) transmits information on a mobility access classifier and reattachment zone of the UE to an authenticator in a network entry stage. The mobility access classifier indicates a fixed UE or a nomadic UE. The reattachment zone indicates a list of BSs accessible by the fixed UE or the nomadic UE. The UE transmits an AAI-RNG-REQ message to the BS to perform the location update. The BS transmits an R4_LU_Req message to an anchor paging controller (PC) access service network (ASN). The anchor PC ASN receives the R4_LU_Req message and confirms information on the mobility access classifier and reattachment zone of the UE. If an identifier (ID) of a BS on which the UE intends to perform the location update is not included in the list of the BSs of the reattachment zone, the R4_LU_Req message is transmitted to the BS so that the UE performs an initial network reentry with respect to the BS instead of the location update.

In addition, in the paging process, the anchor PC ASN confirms the information on the mobility access classifier and reattachment zone of the UE before transmitting a paging announcement. If the UE is the fixed or nomadic UE, the anchor PC ASN can transmit the paging announcement only for a BS included in the list of the reattachment zone.

Meanwhile, an M2M device can perform the location update similarly to a typical UE. There may be a need for a more effective location update method according to a characteristic of an M2M application to which the M2M device is applied.

SUMMARY OF THE INVENTION

The present invention provides a method and apparatus for a location update in a wireless communication system. The present invention also provides a method of autonomously performing a location update if a machine-to-machine (M2M) device is out of a reattachment zone.

In an aspect, a location update method performed by a machine-to-machine (M2M) device in a wireless communication system is provided. The method includes transmitting a mobility access classifier indicating a mobility access classification of the M2M device to a base station, receiving information on a reattachment zone indicating a list of base stations accessible by the M2M device from the first base station, transitioning to an idle mode, and performing the location update to a second base station based on whether the M2M device is out of the attachment zone.

The mobility access classification indicates whether the M2M device may be a fixed or nomadic M2M device.

The mobility access classifier may be transmitted by using an AAI-SBC-REQ message or an AAI-REG-REQ message.

The mobility access classifier may be delivered from the first base station to an access service network (ASN) gateway (GW).

The information on the reattachment zone may be received by using an AAI-SBC-RSP message or an AAI-REG-RSP message.

The information on the reattachment zone may be delivered from an ASN GW to the first base station.

The transitioning to the idle mode may comprise transmitting an AAI-DREG-REQ message to the first base station to request to enter the idle mode, receiving an AAI-DREG-RSP message from the first base station in response to the AAI-DREG-REQ message.

The AAI-DREG-REQ message may include a paging cycle and a paging offset.

Whether the M2M device is out of the reattachment zone may be determined according to whether information on a BS on which the M2M device camps is different from information on a BS of the reattachment zone.

The performing of the location update to the second base station may include transmitting an AAI-RNG-REQ message to the second base station.

The method may further include receiving from the second base station an AAI-RNG-RSP message indicating a failure of the location update and a start of an initial network reentry, and performing the initial network reentry to the second base station.

The failure of the location update and the start of the initial network reentry may be indicated by a location update response field in the AAI-RNG-RSP message.

A value of the location update response field may be 2.

the performing of the initial network reentry to the second base station may include transmitting a second AAI-RNG-REQ message to the second base station, and receiving from the second base station a second AAI-RNG-RSP message including the information on the reattachment zone indicating the list of the base stations accessible by the M2M device.

In another aspect, a machine-to-machine (M2M) device in a wireless communication system is provided. The M2M device includes a radio frequency (RF) unit for transmitting and receiving a radio signal, and a processor operatively coupled to the RF unit. The processor is configured for transmitting a mobility access classifier indicating a mobility access classification of the M2M device to a base station, receiving information on a reattachment zone indicating a list of base stations accessible by the M2M device from the first base station, transitioning to an idle mode, and performing the location update to a second base station based on whether the M2M device is out of the attachment zone.

According to the present invention, a signaling overhead can be more decreased than a case where a machine-to-machine (M2M) device performs an initial network entry.

DESCRIPTION OF EXEMPLARY
EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
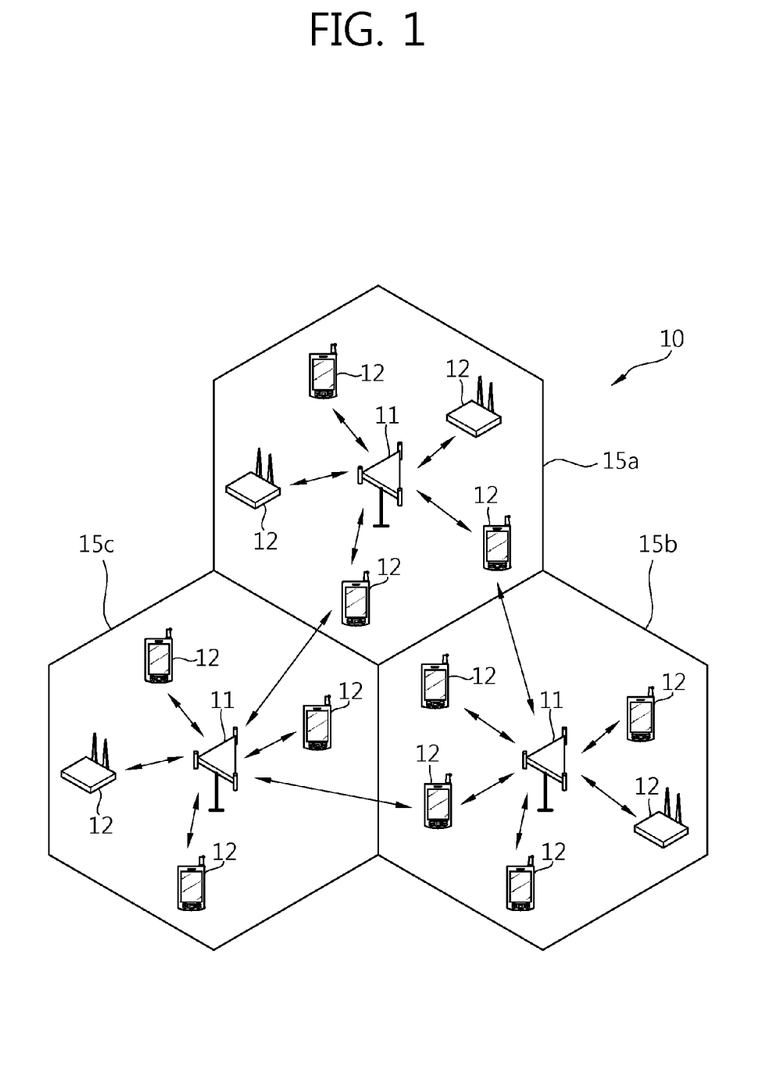
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
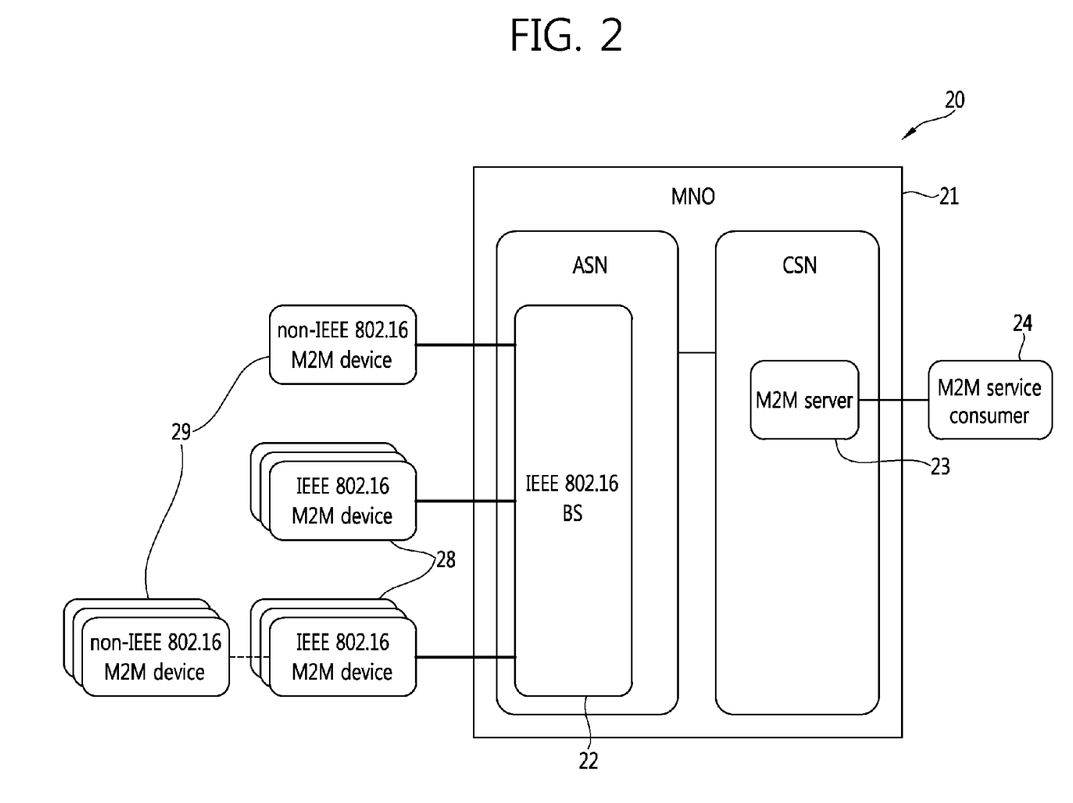
FIG. 2 shows basic M2M service system architecture of IEEE 802.16 supporting machine-to-machine (M2M) communication.

FIG. 2 shows basic M2M service system architecture of IEEE 802.16 supporting machine-to-machine (M2M) communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
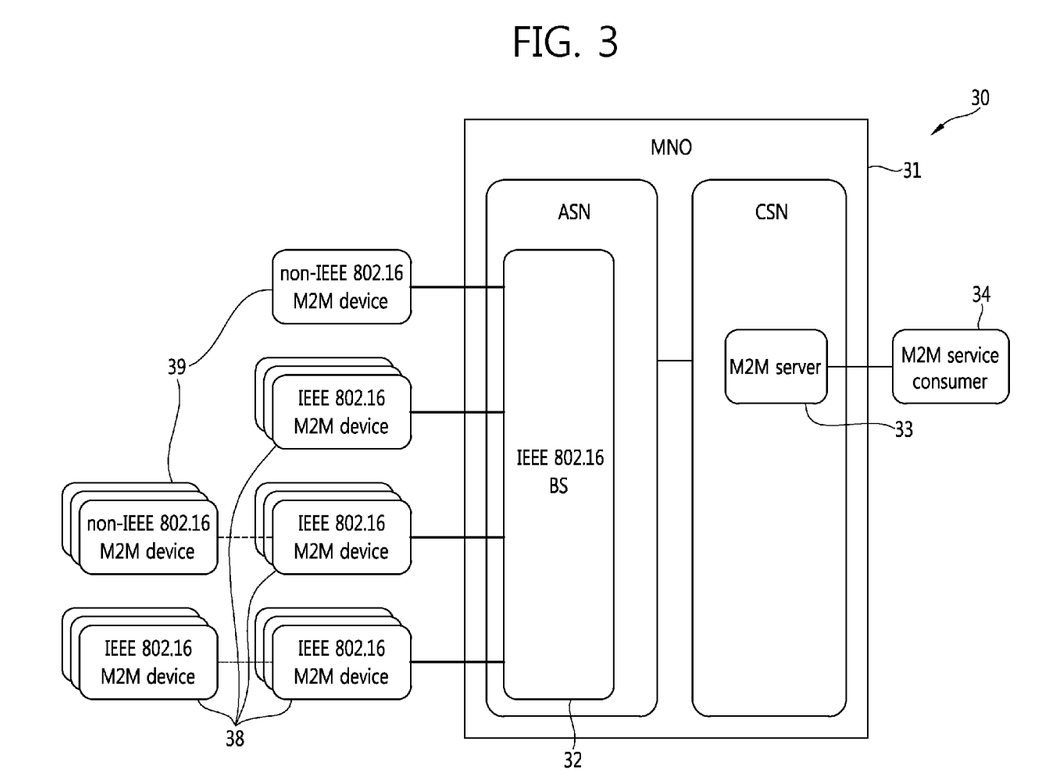
FIG. 3 shows advanced M2M service system architecture of IEEE 802.16 supporting M2M communication.

FIG. 3 shows advanced M2M service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Hereinafter, IEEE 802.16e and IEEE 802.16m frame structures will be described.

Figure 4:
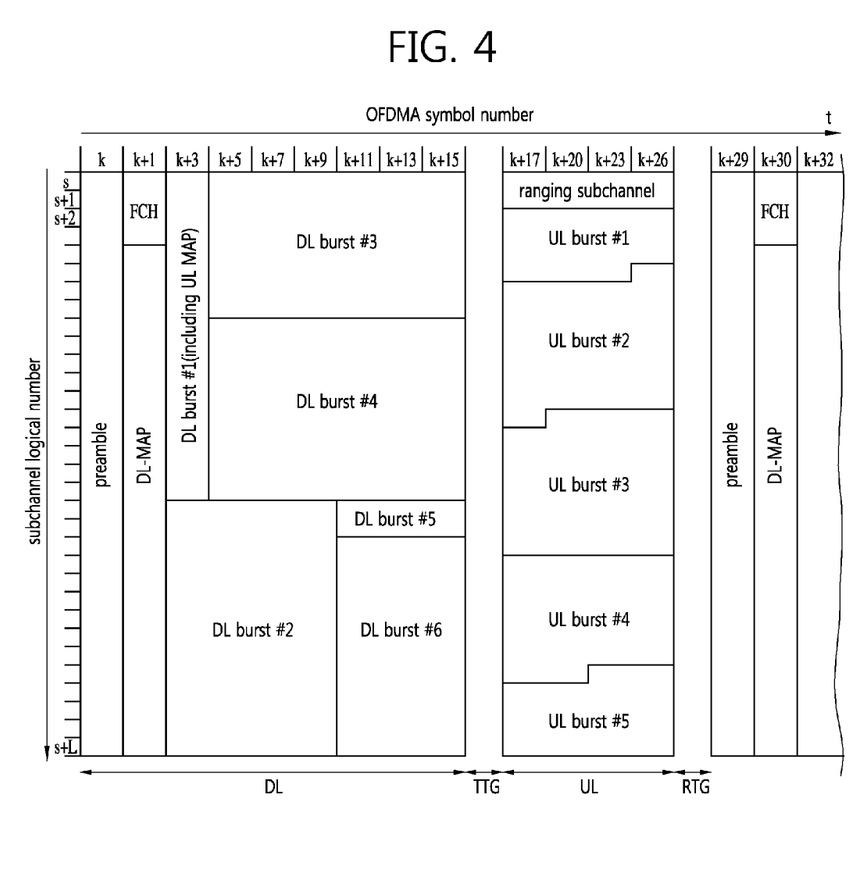
FIG. 4 shows an example of an IEEE 802.16e frame structure.

FIG. 4 shows an example of an IEEE 802.16e frame structure.

A time division duplex (TDD) frame structure of IEEE 802.16e is shown in FIG. 4. The TDD frame includes a downlink (DL) transmission period and an uplink (UL) transmission period. The DL transmission period temporally precedes the UL transmission period. The DL transmission period sequentially includes a preamble, a frame control header (FCH), a DL-MAP, a UL-MAP, and a DL burst region. The UL transmission period includes a ranging subchannel and a UL burst region. A guard time for identifying the UL transmission period and the DL transmission period is inserted to a middle portion (between the DL transmission period and the UL transmission period) and a last portion (next to the UL transmission period) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and an MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of a frame. The fast feedback region is used to transmit information that requires a fast response from the BS. The fast feedback region can be used for CQI transmission. A location of the fast feedback region is determined by the UL-MAP. The location of the fast feedback region may be a fixed location in the frame, or may be a variable location.

Figure 5:
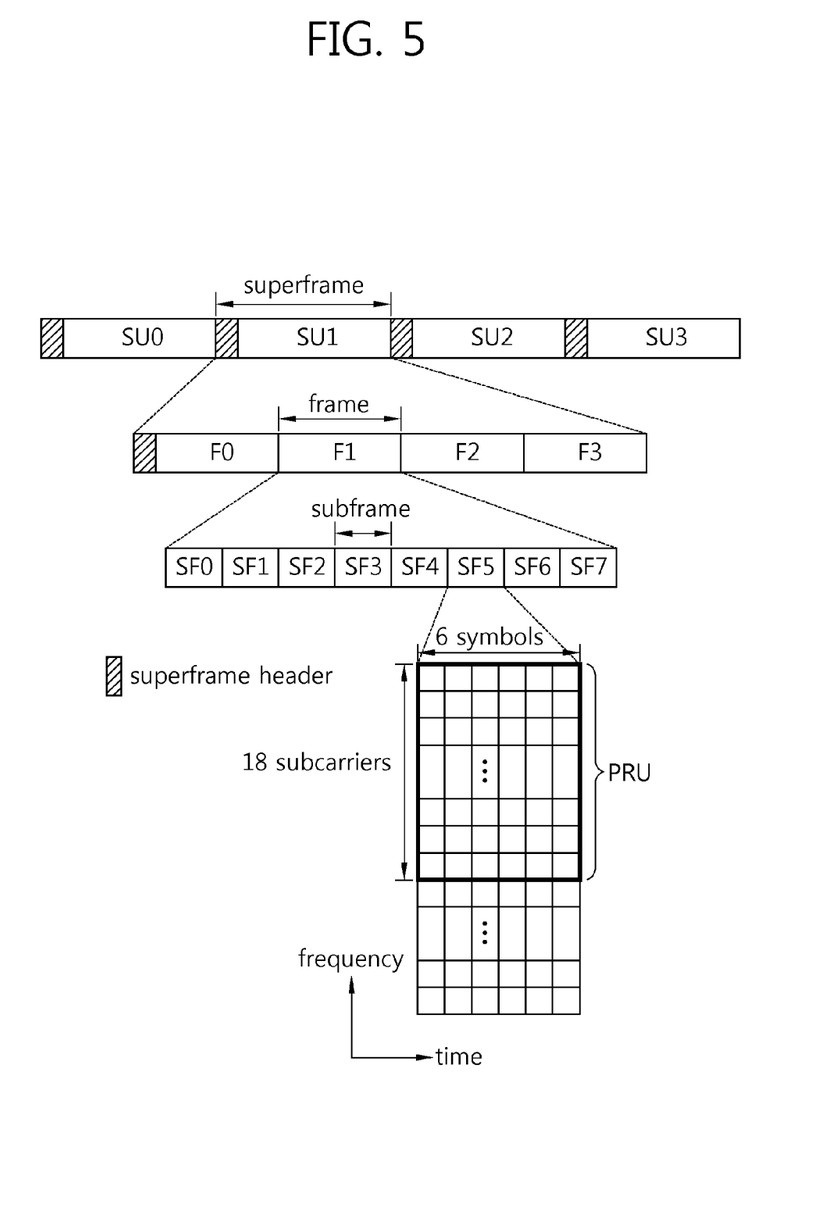
FIG. 5 shows an example of an IEEE 802.16m frame structure.

FIG. 5 shows an example of an IEEE 802.16m frame structure.

Referring to FIG. 5, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.163 frame structure of FIG. 4

TABLE 1

| | | | | | | | |
|---|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time $T_b$(µs) | | | 91.4 | 128 | 102.4 | 91.4 | 91.4 |
| G = 1/8 | Symbol time, $T_s$(µs) | | 102.857 | 144 | 115.2 | 102.857 | 102.857 |
| | FDD | Number of OFDMA symbols per 5 ms frame | 48 | 34 | 43 | 48 | 48 |
| | | Idle time(µs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(µs) | 165.714 | 248 | 161.6 | 165.714 | 165.714 |
| G = 1/16 | Symbol time, $T_s$(µs) | | 97.143 | 136 | 108.8 | 97.143 | 97.143 |
| | FDD | Number of OFDMA symbols per 5 ms frame | 51 | 36 | 45 | 51 | 51 |
| | | Idle time(µs) | 45.71 | 104 | 104 | 45.71 | 45.71 |
| | TDD | Number of OFDMA symbols per 5 ms frame | 50 | 35 | 44 | 50 | 50 |
| | | TTG + RTG(µs) | 142.853 | 240 | 212.8 | 142.853 | 142.853 |
| G = 1/4 | Symbol time, $T_s$(µs) | | 114.286 | 160 | 128 | 114.286 | 114.286 |
| | FDD | Number of OFDMA symbols per 5 ms frame | 43 | 31 | 39 | 43 | 43 |
| | | Idle time(µs) | 85.694 | 40 | 8 | 85.694 | 85.694 |
| | TDD | Number of OFDMA symbols per 5 ms frame | 42 | 30 | 38 | 42 | 42 |
| | | TTG + RTG(µs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G \cdot T_b$, an OFDMA symbol time $T_s$ is $T_b+T_g$, and a sampling time is $T_b/N_{FFT}$.

Ranging implies a process for maintaining quality of radio frequency (RF) communication between the UE and the BS. According to the ranging, a timing offset, a frequency offset, and a power adjustment value can be accurately obtained, and transmission of the UE can be aligned with the BS. A plurality of M2M devices can perform contention-based ranging with each other. The plurality of M2M devices may belong to an M2M group. M2M devices belonging to the same M2M group share a criterion of the same M2M service application and/or the same M2M user.

The UE can perform a location update and report this to the BS. The location update can be performed when a specific condition is satisfied. Examples of the condition by which the location update can be performed include a paging group based update, a timer based update, a power down update, a multicast broadcast service (MBS) update, etc.

When the UE performs the location update, the UE may attach a paging cycle change field to an AAI-RNG-REQ message to change a paging cycle. The BS may change the paging cycle of the UE by requesting the location update of the UE by the use of the paging message. Alternatively, the BS may attach proper paging cycle configuration information to an AAI-RNG-RSP message in response to the AAI-RNG-REQ message transmitted from the UE during the location update. The UE may report its mobility information to the BS during the location update. The mobility information of the UE may be used to allocate a new paging group. In addition, during the location update, a deregistration identifier, paging cycle, paging offset, etc., of the UE can be updated.

The paging group based locate update may be performed when the UE moves to another paging group other than a paging group allocated to the UE in an idle mode. The paging group based location update may be performed when the UE detects that a selected preferred BS does not support the currently allocated paging group. The UE may monitor and detect paging group IDs (PGIDs) included in a paging group ID information message (PGID-Info message) transmitted by the preferred BS.

When performing the location update, the UE may transmit an AAI-RNG-REQ message to the BS. The AAI-RNG-REQ message may be transmitted in a network entry process. The UE may generate a parameter included in the AAI-RNG-REQ message according to a usage of the AAI-RNG-REQ message. In addition, the BS may transmit an AAI-RNG-RSP message to the UE in response to the AAI-RNG-REQ message. If the UE transmits the AAI-RNG-REQ message in the location update process, the BS may receive this message and indicate whether the location update of the UE is successful by using the AAI-RNG-RSP message. Table 2 shows an example of the AAI-RNG-RSP message transmitted when performing the location update.

TABLE 2

| Field | Size (bits) | Description | Condition |
|---|---|---|---|
| ... | | | |
| Location Update Response | 4 | 0x0 = Success of Location Update<br>0x1 = Failure of Location Update<br>0x2 = reserved<br>0x3 = Success of location update and DL traffic pending<br>0x4 = Allow UE's DCR mode initiation request or DCR mode extension request<br>0x5 = Reject UE's DCR mode initiation request or DCR mode extension request0x6~0xF: Reserved | Shall be included when this message is sent in response to an AAI-RNG-REQ message used to perform location update or DCR mode initiation from Idle Mode or DCR mode extension. |
| If (Location Update Response ==0x0) {<br>...<br>}<br>... | | | |

Meanwhile, among the M2M applications, there is an application which reports location information of the M2M device when it is out of a specific area (i.e., a cell or a BS area) or which allows the network to determine the location information of the M2M device. For example, in case of an electronic anklet for recognizing a location of a sexual offender, the network must be able to recognize and track the location of the M2M device when a user is out of a specific area. In this case, the conventional paging group is not appropriate for the purpose of reporting the location of the M2M device since the area of the paging group is wide. Therefore, there is a need for a method for reporting location information of the M2M device in a unit of cell or BS having a small area.

Meanwhile, in general, if the UE in the idle mode is out of a reattachment zone, the network forces the UE to perform a network reentry. Accordingly, the network can persistently track location information of the UE which is out of the reattachment zone. However, if the network reentry is performed whenever the UE is out of the reattachment zone, a signaling overhead may occur. Accordingly, a more effective location update method is required.

Hereinafter, the proposed location update method will be descried according to an embodiment of the present invention. The location update method proposed according to an embodiment of the present invention is a method in which, when an M2M device in an idle mode is out of a reattachment zone, the M2M device autonomously performs a location update instead of performing an initial network entry.

Figure 6:
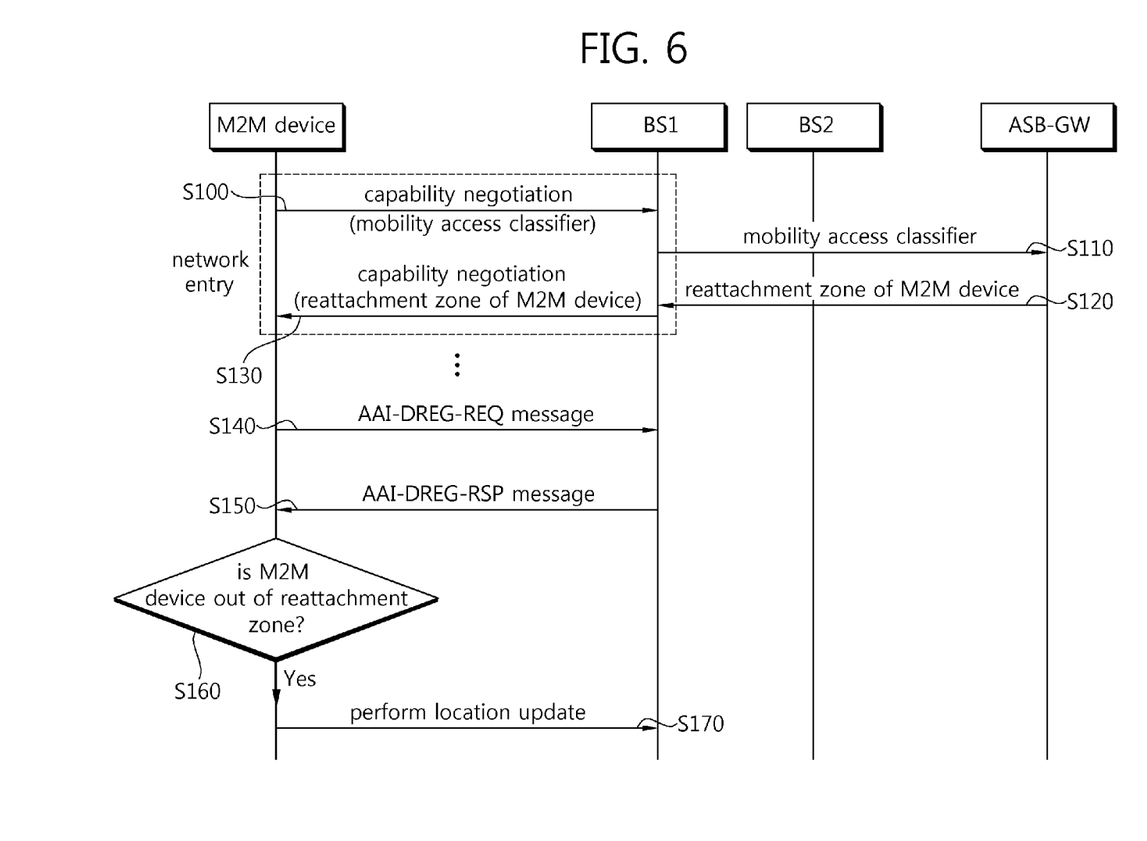
FIG. 6 shows an example of a location update method proposed according to an embodiment of the present invention.

FIG. 6 shows an example of a location update method proposed according to an embodiment of the present invention.

In step S100, an M2M device performs a capability negotiation with a first BS in an initial network entry stage. The M2M device may perform the capability negotiation with the first BS by transmitting an AAI-SBC-REQ message for negotiating over a basic capability during the network entry. Alternatively, the M2M device may negotiate over a general capability during the network entry and may perform the capability negotiation with the first BS by transmitting an AAI-REG-REQ message to perform a registration. In this case, the AAI-SBC-REQ message or the AAI-REG-REQ message may be used to negotiate a mobility access classifier of the M2M device. The mobility access classifier indicates whether the M2M device is a fixed M2M device or a nomadic device.

In step S110, the first BS delivers to an access service network gateway (ASG-GW) the mobility access classifier received from the M2M device.

In step S120, the ASG-GW sets a reattachment zone of the M2M device, and reports information on the reattachment zone to the first BS. The reattachment zone indicates a list of BSs accessible by the fixed UE or the nomadic M2M device.

In step S130, the first BS delivers to the M2M device the reattachment zone information received from the ASN-GW. In this case, the reattachment zone information may be transmitted by being included in an AAI-REG-RSP message transmitted in response to an AAI-SBC-RSP message or an AAI-REG-REQ message.

In step S140, the M2M device transmits an AAI-DREG-REQ message to the first BS to transit to an idle mode. In step S150, the first BS transmits an AAI-DREG-RSP message to the M2M device to allow the M2M device to transit to the idle mode.

In step S160, the M2M device determines whether the M2M device is out of the reattachment zone. The M2M device confirms SFH information in a paging available interval, and thus can know that the M2M device is out of the reattachment zone if information on a BS on which the M2M device camps is different from information on a BS in the reattachment zone. In this case, a location update of the M2M device is triggered, and the M2M device performs the location update to a second BS in step S170. The location update may be performed by using an AAI-RNG-REQ message transmitted from the M2M device to the second BS.

Table 3 shows an example of the mobility access classifier included in the AAI-SBC-REQ message or the AAI-REG-REQ message.

TABLE 3

| Field | Size (bits) | Description | Condition |
|---|---|---|---|
| Mobility Access Classifier | | Indicates a mobility access classification of a subscriber. 0: fixed or nomadic M2M device 1: mobility enabled device | Can be included in AAI-SBC-REQ/RSP or AAI-REG-REQ/RSP or AAI-DREG-REQ/RSP. |

Table 4 shows an example of the reattachment zone included in the AAI-SBC-RSP message or the AAI-REG-RSP message.

TABLE 4

| Field | Size (bits) | Description | Condition |
|---|---|---|---|
| Reattachment Zone | | Indicates an ID of BS allowed attachment by an M2M device. Information on the reattachment zone is included if an anchor authenticator is a fixed or nomadic M2M device. | Can be included in AAI-SBC-REQ/RSP or AAI-REG-REQ/RSP or AAI-DREG-REQ/RSP. |

Meanwhile, when the fixed or nomadic M2M device performs the capability negotiation and enters an idle mode in an initial network entry stage as shown in FIG. 6, a paging controller may not allocate a paging group to the M2M device. That is, if the M2M device needs to be paged, since the paging controller does not allocate the paging group to the M2M device, the paging controller delivers a paging announcement only to a BS located in the reattachment zone. In addition, the paging controller can manage an idle mode context irrespective of the paging group with respect to the fixed or nomadic M2M device, and can allocate a paging cycle and a paging offset by using an AAI-DREG-RSP message without a paging group ID when the M2M device requests the entering of the idle mode. In addition, the M2M device may not attach the paging group ID to the AAI-RNG-REQ message in a location update process. Accordingly, an overhead of the AAI-RNG-REQ message may be decreased.

Figure 7:
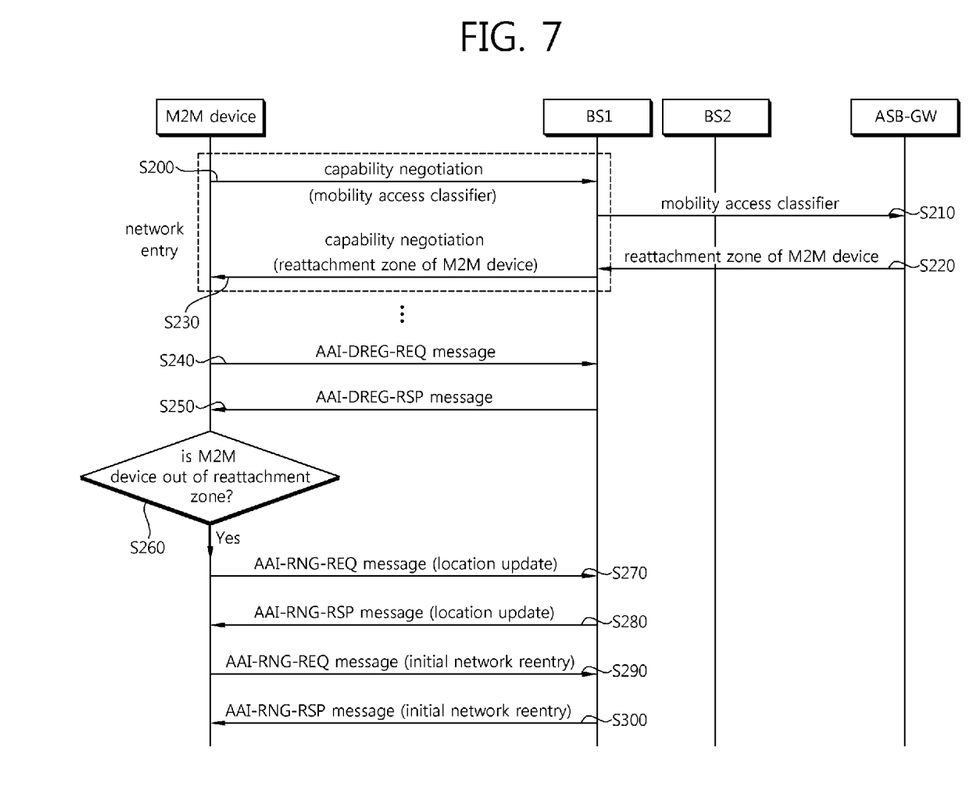
FIG. 7 shows an example of an initial network reentry method proposed according to an embodiment of the present invention.

FIG. 7 shows an example of an initial network reentry method proposed according to an embodiment of the present invention. The initial network reentry method of FIG. 7 may be performed when an M2M device fails in authentication while performing the location update in step S170 of FIG. 6.

In step S200, the M2M device performs a capability negotiation with a first BS in an initial network entry stage. The M2M device may perform the capability negotiation with the first BS by transmitting an AAI-SBC-REQ message.

Alternatively, the M2M device may perform the capability negotiation with the first BS by transmitting an AAI-REG-REQ message. In this case, the AAI-SBC-REQ message or the AAI-REG-REQ message may be used to negotiate a mobility access classifier of the M2M device. The mobility access classifier indicates whether the M2M device is a fixed M2M device or a nomadic device.

In step S210, the first BS delivers to an ASG-GW the mobility access classifier received from the M2M device.

In step S220, the ASG-GW sets a reattachment zone of the M2M device, and reports information on the reattachment zone to the first BS. The reattachment zone indicates a list of BSs accessible by the fixed UE or the nomadic M2M device.

In step S230, the first BS delivers to the M2M device the reattachment zone information received from the ASN-GW. In this case, the reattachment zone information may be transmitted by being included in an AAI-REG-RSP message transmitted in response to an AAI-SBC-RSP message or an AAI-REG-REQ message.

In step S240, the M2M device transmits an AAI-DREG-REQ message to the first BS to transition to an idle mode. In step S250, the first BS transmits an AAI-DREG-RSP message to the M2M device to allow the M2M device to transition to the idle mode.

In step S260, the M2M device determines whether the M2M device is out of a reattachment zone. The M2M device confirms SFH information in a paging available interval, and thus can know that the M2M device is out of the reattachment zone if information on a BS on which the M2M device camps is different from information on a BS in the reattachment zone. In this case, a location update of the M2M device is triggered, and the M2M device performs the location update to a second BS in step S270. The location update may be performed by using an AAI-RNG-REQ message transmitted from the M2M device to the second BS.

The M2M device may fail in authentication while the M2M device performs the location update. In this case, the second BS transmits to the M2M device an AAI-RNG-RSP message including a location update fail indication of the UE in step S280. The AAI-RNG-RSP message is a response for the AAI-RNG-REQ message. The second BS may transmit the AAI-RNG-RSP message to allow the M2M device to perform an initial network reentry instead of the location update.

In step S290, the M2M device performs the initial network reentry to the second BS. Similarly to the location update, the initial network reentry can also be performed by using the AAI-RNG-REQ message. In step S300, the second BS allocates the reattachment zone to the M2M device. The second BS may allocate the reattachment zone by transmitting the AAI-RNG-RSP message to the M2M device.

Table 5 shows an example of the AAI-RNG-RSP message based on the proposed initial network reentry method. Table 5 is modified from Table 2.

TABLE 5

| Field | Size (bits) | Description | Condition |
|---|---|---|---|
| Reattachment Zone | Variable | It indicates thane ID of BS allowed for reattachment or handoff of a fixed or nomadic M2M device. | Shall be present if a mobility access classifier of M2M device indicates a fixed or nomadic M2M device. |
| Location Update Response | 4 | 0x0 = Success of Location Update 0x1 = Failure of Location Update 0x2 = Failure of Location Update and Start Initial Network Entry 0x3 = Success of location update and DL traffic pending 0x4 = Allow UE's DCR mode initiation request or DCR mode extension request 0x5 = Reject UE's DCR mode initiation request or DCR mode extension request0x6~0xF: Reserved | It is included when a ranging response message is transmitted in response to AAI-RNG-REQ messages used to perform location update or to initialize or extend DCR mode from idle mode. |

Referring to Table 4, the AAI-RNG-RSP message may include at least one of a Reattachment Zone field and a Location Update Response field. The Reattachment Zone field may be transmitted from the second BS by being included in the AAI-RNG-RSP message when the M2M device fails in the location update and attempts to an initial network reentry to the second BS. The Reattachment Zone field may be included when the mobility access classifier of the M2M device indicates the fixed or nomadic M2M device. In addition, the Reattachment Zone field may be included in the AAI-REG-RSP message in the initial network entry process. The Location Update Response field may be transmitted from the second BS by being included in the AAI-RNG-RSP message when the M2M device fails in authentication in the location update process of the M2M device. If a value of the Location Update Response field is 0x02, the second BS may indicate a locate update failure and an initial network reentry to the M2M device.

Figure 8:
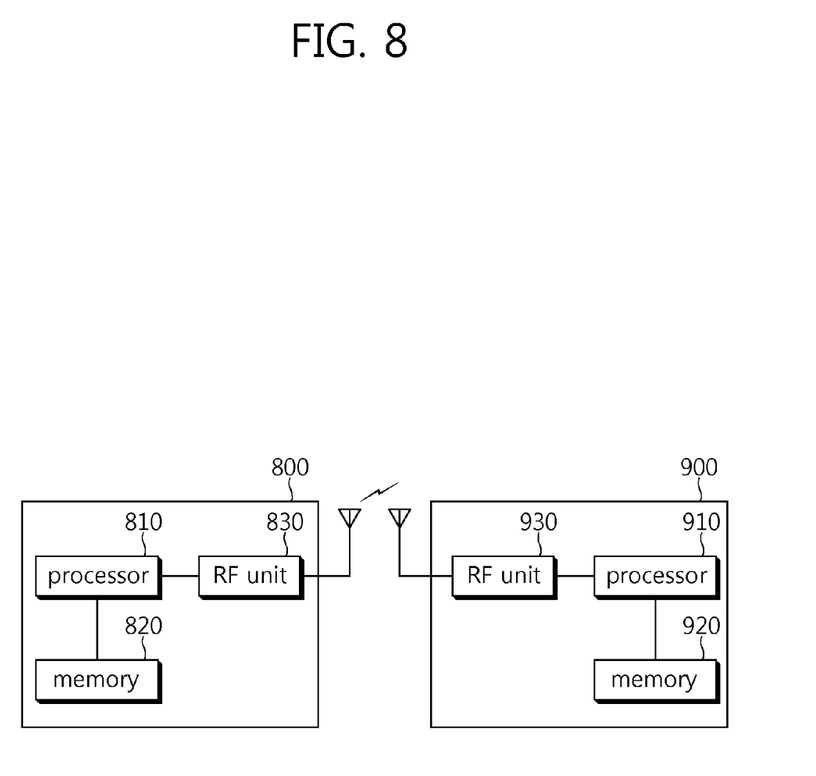
FIG. 8 is a block diagram showing wireless communication system to implement an embodiment of the present invention.

FIG. 8 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A location update method performed by a machine-to-machine (M2M) device in a wireless communication system, the method comprising:
    transmitting a mobility access classifier indicating a mobility access classification of the M2M device to a base station;
    receiving information on a reattachment zone indicating a list of base stations accessible by the M2M device from the first base station;
    transitioning to an idle mode;
    performing the location update to a second base station based on whether the M2M device is out of the attachment zone;
    receiving from the second base station an AAI-RNG-RSP message indicating a failure of the location update and a start of an initial network reentry; and
    performing the initial network reentry to the second base station.

2. The method of claim 1, wherein the mobility access classification indicates whether the M2M device is a fixed or nomadic M2M device.

3. The method of claim 1, wherein the mobility access classifier is transmitted by using an AAI-SBC-REQ message or an AAI-REG-REQ message.

4. The method of claim 1, wherein the mobility access classifier is delivered from the first base station to an access service network (ASN) gateway (GW).

5. The method of claim 1, wherein the information on the reattachment zone is received by using an AAI-SBC-RSP message or an AAI-REG-RSP message.

6. The method of claim 1, wherein the information on the reattachment zone is delivered from an ASN GW to the first base station.

7. The method of claim 1, wherein the transitioning to the idle mode comprises:
    transmitting an AAI-DREG-REQ message to the first base station to request to enter the idle mode;
    receiving an AAI-DREG-RSP message from the first base station in response to the AAI-DREG-REQ message.

8. The method of claim 7, wherein the AAI-DREG-REQ message includes a paging cycle and a paging offset.

9. The method of claim 1, wherein whether the M2M device is out of the reattachment zone is determined according to whether information on a BS on which the M2M device camps is different from information on a BS of the reattachment zone.

10. The method of claim 1, wherein the performing of the location update to the second base station includes transmitting an AAI-RNG-REQ message to the second base station.

11. The method of claim 1, wherein the failure of the location update and the start of the initial network reentry are indicated by a location update response field in the AAI-RNG-RSP message.

12. The method of claim 11, wherein a value of the location update response field is 2.

13. The method of claim 1, wherein the performing of the initial network reentry to the second base station includes:
- transmitting a second AAI-RNG-REQ message to the second base station; and
- receiving from the second base station a second AAI-RNG-RSP message including the information on the reattachment zone indicating the list of the base stations accessible by the M2M device.

14. A machine-to-machine (M2M) device in a wireless communication system, the M2M device comprising:
- a radio frequency (RF) unit for transmitting and receiving a radio signal; and
- a processor operatively coupled to the RF unit,
- wherein the processor is configured to:
- transmit a mobility access classifier indicating a mobility access classification of the M2M device to a base station;
- receive information on a reattachment zone indicating a list of base stations accessible by the M2M device from the first base station;
- transit to an idle mode;
- perform the location update to a second base station based on whether the M2M device is out of the attachment zone;
- receive from the second base station an AAI-RNG-RSP message indicating a failure of the location update and a start of an initial network reentry; and
- perform the initial network reentry to the second base station.

* * * * *